(12) United States Patent
Pokorny

(10) Patent No.: US 10,312,766 B2
(45) Date of Patent: Jun. 4, 2019

(54) SUBMERSIBLE-RATED ROLLER TABLE MOTOR

(71) Applicant: Vault Motors LLC, Kalispell, MT (US)

(72) Inventor: Michael E. Pokorny, Kalispell, MT (US)

( * ) Notice: Subject to any disclaimer, the term of this patent is extended or adjusted under 35 U.S.C. 154(b) by 171 days.

(21) Appl. No.: 15/491,317

(22) Filed: Apr. 19, 2017

(65) Prior Publication Data

US 2018/0309341 A1    Oct. 25, 2018

(51) Int. Cl.
| | |
|---|---|
| *H02K 5/16* | (2006.01) |
| *H02K 5/132* | (2006.01) |
| *H02K 5/22* | (2006.01) |
| *H02K 7/08* | (2006.01) |
| *H01R 13/52* | (2006.01) |
| *H02K 5/06* | (2006.01) |
| *H02K 5/12* | (2006.01) |
| *H02K 5/173* | (2006.01) |
| *H02K 5/18* | (2006.01) |
| *H01R 4/34* | (2006.01) |
| *H01R 13/74* | (2006.01) |

(52) U.S. Cl.
CPC ........... *H02K 5/132* (2013.01); *H01R 13/521* (2013.01); *H02K 5/06* (2013.01); *H02K 5/12* (2013.01); *H02K 5/16* (2013.01); *H02K 5/1732* (2013.01); *H02K 5/18* (2013.01); *H02K 5/225* (2013.01); *H02K 7/083* (2013.01); *H01R 4/34* (2013.01); *H01R 13/74* (2013.01)

(58) Field of Classification Search
CPC ............ H02K 5/132; H02K 5/12; H02K 5/16; H02K 5/06
USPC .......................................................... 310/87
See application file for complete search history.

(56) References Cited

U.S. PATENT DOCUMENTS

| | | | | |
|---|---|---|---|---|
| 2,085,998 | A * | 7/1937 | Potter ..................... | F04D 13/10 310/87 |
| 2,404,783 | A * | 7/1946 | Blom ..................... | H02K 5/132 277/366 |
| 4,598,219 | A | 7/1986 | Gaylord et al. | |
| 5,237,228 | A * | 8/1993 | Fries .................... | H02K 5/1732 310/87 |
| 5,793,132 | A | 9/1998 | Hirose et al. | |
| 8,636,479 | B2 | 1/2014 | Kenyon et al. | |
| 9,450,475 | B2 | 10/2016 | Zumstein et al. | |
| 9,461,517 | B2 | 10/2016 | Bratthaell et al. | |
| 2008/0304986 | A1 | 12/2008 | Kenyon et al. | |
| 2010/0253164 | A1* | 10/2010 | Chamberlin .......... | H02K 5/225 310/71 |
| 2014/0084723 | A1* | 3/2014 | Schuler ................ | H02K 5/1672 310/88 |
| 2014/0101926 | A1 | 4/2014 | Kenyon et al. | |

(Continued)

*Primary Examiner* — Terrance L Kenerly

(57) ABSTRACT

A submersible-rated motor with a non-drive end bearing housing that is incorporated directly into the motor housing in a single casting, a terminal plate assembly that includes a terminal box cast directly onto the non-drive end of the motor housing, a drive end seal housing that is configured to enclose an oil reservoir and a shaft seal assembly, and a drive end bearing housing that is mounted completely inside of the seal housing. The seal housing is sealed separately from the motor housing. Both the drive end bearing housing and the seal housing are piloted for concentricity with the drive end of the motor housing.

10 Claims, 14 Drawing Sheets

(56) References Cited

U.S. PATENT DOCUMENTS

| | | |
|---|---|---|
| 2015/0130386 A1 | 5/2015 | Zumstein et al. |
| 2015/0256054 A1* | 9/2015 | Northwall ............. H02K 5/136 |
| | | 310/68 C |
| 2016/0118855 A1 | 4/2016 | Maruyama et al. |

* cited by examiner

SUBMERSIBLE-RATED ROLLER TABLE MOTOR

BACKGROUND OF THE INVENTION

1. Field of the Invention

The present invention relates generally to the field of electric motors, and more particularly, to a submersible-rated electric motor that is specifically designed for use in connection with a roller table in the steel mill industry.

2. Description of the Related Art

Roller tables are used in the steel mill industry to move red-hot steel as it is being extruded, shaped and sprayed with water. Roller tables consist of a series of motor-driven rollers that extend outward from the side of the roller table. These motors are electric, and covers are installed over them to insulate them from the water that is being sprayed onto the red-hot steel. These covers, however, do not prevent ambient moisture and dust solids from entering the motor housing. As the motors are operated, the electrical stator and bearings heat the air inside the motor housing, causing the air to expand and be expelled through orifices in the motor housing. Conversely, as the motor cools, air volume inside the motor housing decreases, thereby drawing ambient air into the motor housing.

In a steel mill, this ambient air contains high levels of moisture and dust solids. Because conventional roller table motors are not sealed or otherwise designed to maintain a constant air volume inside of the motor housing, the housing operates like an air pump as it cycles through heating and cooling operations. Eventually, sufficient moisture will condense on the electrical stator and/or sufficient dust solids will enter the bearings to cause the motor to fail. Motor failure is rampant in the steel mill industry and costly both in terms of decreased production and motor replacement expenses.

There are examples in the prior art of submersible motors and motors that attempt to alleviate issues associated with the changes in air pressure inside of the motor as it heats and cools, but none of these inventions incorporates the structural design features of the present invention, nor are such inventions specifically adapted for use on a steel mill roller table. For example, U.S. Pat. No. 4,598,219 (Gaylord et al., 1986) discloses a submersible motor with a gas-filled housing in which gas is permitted to enter the housing through a first conduit and discharged (along with accumulated liquid) from the housing through a second conduit. Although the motor enclosure is submersible, the invention utilizes an external source of compressed air to supply pressurized air to the motor. This pressurization of air inside of the motor maintains a positive pressure on the seals, thereby preventing liquid from traveling into the motor.

U.S. Pat. No. 9,461,517 (Bratthaell et al. 2016) involves an electrical motor for a submersible machine. Like the present invention, this invention incorporates seals that reside in an oil bath, but this motor is dissimilar to the present invention in that it does not purport to maintain a constant air volume inside of the motor housing. Stranded cable conductors are used (see discussion of stranded cables in Detailed Description of Invention section below), but the invention does not incorporate any mechanism for preventing the flow of air through voids in the stranded cable. Further examples of non-submersible motors are discussed below.

U.S. Pat. No. 5,793,132 (Hirose et al., 1998) describes an electric wheel motor in which an electric leader line extends from the inside to the outside of the main motor body and connects the inside of the main motor body to the outside of the main motor body via a breather passage. The purpose of this breather passage is to allow air to move into and out of the main motor body, thereby equalizing pressure between the inside of the motor body and the outside environment. This motor is not submersible.

U.S. Pat. No. 8,636,479 (Kenyon et al., 2014) and U.S. Patent Application Pub. No. 20140101926 (Kenyon et al.) describe a blower with a stationary portion having an inlet and an outlet and a rotating portion that is driven by a motor. The stationary portion includes a housing, a stator component, and a tube. The rotating portion includes one or more bearings along the inner surface of the tube to support a rotor within the tube. The purpose of this invention is to supply air at positive pressure, presumably to a continuous positive airway pressure (CPAP) machine. The motor described in this patent is not submersible, nor does it incorporate any shaft seals.

U.S. Pat. No. 9,450,475 (Zumstein et al., 2016) provides an aquatic pump motor with a motor shell, drive unit, electronics assembly configured to operate the drive unit, and shaft coupled to the drive unit. In one embodiment, the motor is totally enclosed, the shaft is sealed with a labyrinth seal, and the electronics assembly is contained within the motor shell. The motor is cooled with first and second fan assemblies. This motor is not submersible and is designed to reduce noise.

U.S. Patent Application Pub. No. 20160118855 (Maruyama et al.) discloses a waterproof motor with a columnar motor body and a center hole that penetrates the motor body in an axial direction. The motor body housing has a cylindrical part that covers the peripheral surface of the motor body, a rotation output part that is situated on an upper side of the cylindrical part in the axial direction and fixed to rotary bodies of the motor body, and a fixed part on a lower side of the cylindrical part in the axial direction and fixed to fixed bodies of the motor body. The housing is sealed at only one place on the cylindrical part in the axial direction. The invention incorporates the use of an air purge system to maintain a positive pressure inside of the motor housing. Although purportedly waterproof, this motor is not submersible.

In contrast to the prior art examples discussed above, it is an object of the present invention to provide a fully submersible motor in which the environment inside of the motor housing is completely separated from and controlled relative to the outside environment, thereby preventing moisture and/or dust solids from entering the motor housing and greatly increasing the life of the motor. It is a further object of the present invention to provide a motor in which the number of seals is minimized and air volume inside of the motor housing is maintained at a relatively constant level while air pressure is allowed to fluctuate. Yet another object of the present invention is to eliminate the need for an external source of compressed air; utilization of such systems makes installation more difficult, increases operating costs, and imposes additional maintenance requirements. Further details and advantages of the present invention are discussed below.

BRIEF SUMMARY OF THE INVENTION

The present invention is a submersible-rated motor comprising: a motor housing that is configured to enclose a stator and a rotor and to partially enclose a drive shaft, the motor housing comprising a drive end and a non-drive end, wherein the motor housing comprises a non-drive end bearing housing that is incorporated directly into the motor housing in a single casting; a terminal plate assembly comprising a terminal box and a removable terminal cover, wherein the terminal box is cast directly onto the non-drive end of the motor housing, wherein the terminal plate assembly is configured to receive one or more stranded power conductors on a first side of a nonconductive terminal plate, wherein each of the power conductors is attached to the terminal plate assembly with a standard compression terminal lug, wherein each terminal lug is bolted to a terminal pin that is both solid and conductive, wherein each terminal pin is fixed and sealed to the terminal plate, and wherein the terminal plate assembly is sealed to the motor housing; a seal housing that is sealed separately from the motor housing and configured to contain a shaft seal assembly and an oil reservoir, wherein the seal housing is sealed to and piloted for concentricity with the drive end of the motor housing; and a drive end bearing housing that is mounted completely inside of the seal housing and piloted for concentricity with the motor housing, wherein the drive end bearing housing is configured to enclose a first ball bearing situated around the drive shaft on the drive end of the motor; wherein the non-drive end bearing housing is configured to enclose a second ball bearing that is situated around the drive shaft on the non-drive end of the motor.

In a preferred embodiment, each of the terminal lugs is secured to a terminal pin insulator that covers the terminal pin. Preferably, the terminal plate assembly is configured to receive one or more stranded stator conductors on a second side of the terminal plate, each of the stator conductors is attached to the terminal plate assembly with a standard compression terminal lug, each terminal lug is bolted to a terminal pin that is both solid and conductive, and each terminal pin is fixed and sealed to the terminal plate. Each terminal pin preferably comprises interiorly threaded ends and a solid center section, wherein the threaded ends of the terminal pin are configured to receive a retainer bolt that secures a terminal lug to the terminal pin.

In a preferred embodiment, the shaft seal assembly is situated entirely within the seal housing and comprises a first stationary seal, a second stationary seal, and a rotating seal assembly; wherein the rotating seal assembly is situated between the first and second stationary seals; wherein the first stationary seal is sealed to the seal housing, and second stationary seal is sealed to the drive end bearing housing; and wherein the rotating seal assembly comprises a rotating seal and at least one O-ring that is configured to seal the rotating seal to the drive shaft. Preferably, the rotating seal comprises a first outer edge and a second outer edge, the first stationary seal comprises an inner edge, and the second stationary seal comprises and inner edge; wherein the first outer edge of the rotating seal abuts up against the inner edge of the first stationary seal with a spring force that is driven axially along the drive shaft, and the second outer edge of the rotating seal abuts up against the inner edge of the second stationary seal with a spring force that is driven axially along the drive shaft. The first ball bearing is preferably secured to the drive end bearing housing with a bearing lock ring.

In a preferred embodiment, the invention further comprises a shaft grounding ring that is configured to conduct electrical voltage from the drive shaft to the motor housing. In another preferred embodiment, the invention further comprises a wave disk spring that is situated adjacent to the non-drive end bearing on an outer end of the non-drive end bearing, wherein the wave disk spring is configured to contact the non-drive end bearing but not the drive shaft.

REFERENCE NUMBERS

Figure 1:
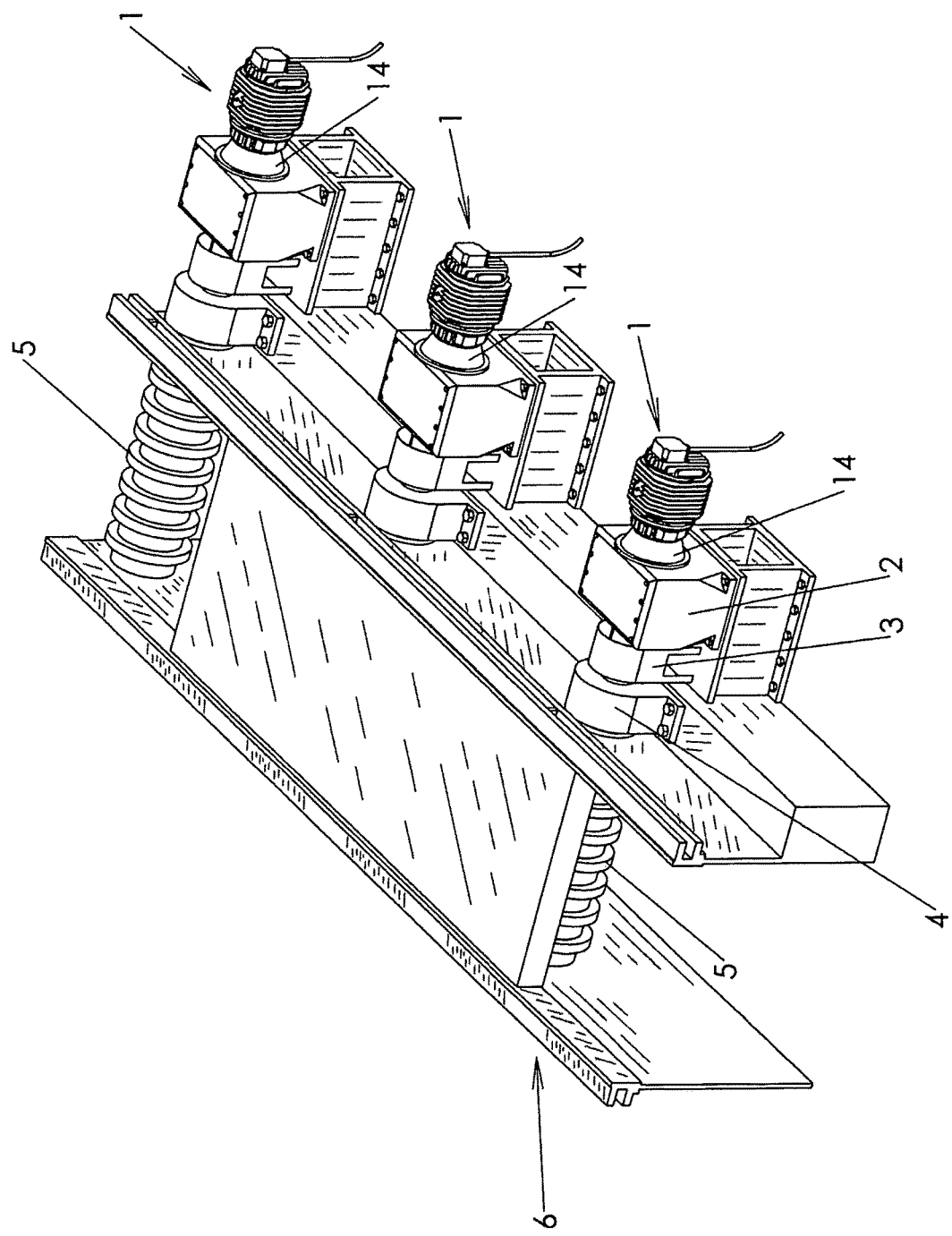
FIG. 1 is a perspective view of the present invention installed on a roller table.

1 Present invention (submersible-rated motor)
2 Gear box
3 Safety cover
4 Pillow block bearing
5 Roller (of roller table)
6 Roller table
7 Motor housing
8 Drive shaft
9 Seal housing
10 Cooling fins (on motor housing)
11 Cooling fins (on seal housing)
12 Bolt holes (in seal housing)
13 Face plate (of seal housing)
14 Flange
15 Bearing housing
16 Bolt holes (in motor housing)
17 Stator
18 Rotor
19 Radial fins (on rotor)
20 Terminal plate assembly
21 Terminate plate cover
22 Main conductor cable
23 Cord grip compression grommet
24 Cable ground conductor
25 Cable power conductor
26 Terminal lug
27 Terminal pin insulator 28 Retainer bolt
29 Terminal box
30 Terminal plate
31 Groove (in terminal pin)
32 Terminal pin O-Ring
33 Terminal pin
34 Terminal pin push nut
35 Terminal plate O-ring
36 Terminal cover O-ring
37 First ball bearing
38 Second ball bearing
39 Seal housing O-ring
40 First stationary seal
41 Second stationary seal
42 Rotating seal assembly
43 O-ring (between first stationary seal and seal housing)
44 O-ring (between second stationary seal and bearing housing)
45 Rotating seal
46 First O-ring (between rotating seal and shaft)
47 Second O-ring (between rotating seal and shaft)
48 Bearing lock ring
49 Shaft grounding ring
50 Stator conductor
51 Foot
52 Bearing housing O-ring
53 Set screw
54 Wave disk spring Note: Reference number 2-6 and 14 are not part of the present invention and are shown only for environmental purposes.

DETAILED DESCRIPTION OF INVENTION

The present invention overcomes the disadvantages of the prior art by providing a motor housing that prevents the transfer of thermally pressurized air, moisture, dust solids, etc. into or out of the motor housing while the motor is operating or not operating. The present invention accomplishes this end by maintaining a constant interior air volume inside of the motor housing while allowing the air pressure inside of the motor housing to fluctuate. The motor housing of the present invention is corrosion-resistant (preferably comprised of stainless steel), fully sealed, and non-vented (i.e., no orifices) to enable full submersion of the motor for an indefinite period of time. As shown in the figures and described more fully below, the rotating shaft of the present invention is sealed to the housing, as is the power supply termination.

In order to minimize the number of seals, the present invention incorporates three innovative casting design changes. First, the non-drive end bearing housing is incorporated directly into the motor housing in a single casting. A conventional roller motor has a separate end bell bearing housing that requires machining two surfaces and assembling the parts with fasteners and a seal. The present invention eliminates this machining, the fasteners and the associated dependent sealing surface. Second, the inboard part of the electrical supply terminal box is cast directly onto the non-drive end rather than being a separate part that is bolted onto the casting. This design feature also eliminates machining, fasteners and another dependent seal. Third, the drive end bearing housing is positioned inside the diameter of the seal housing cover. This design features allows the seal housing to be positioned over the bearing housing and sealed directly to the motor housing.

As noted above, the rotating shaft of the present invention is sealed to the motor housing. In order to effectuate this design change, a separate seal housing and seal assembly is incorporated into the drive end of the motor. This seal housing encloses a rotating seal capable of sealing the drive shaft regardless of whether it is rotating or stationary. In a preferred embodiment, the seal housing is sealed separately from the motor housing because it is oil-filled to cool and lubricate the rotating seal.

On the other end of the motor, the incoming electrical supply is also completely sealed. In the industry, stranded cable conductors are preferred over solid core cable conductors because they allow the conductor to be flexed into the required position for termination. Stranded core conductors, however, contain voids in between the individual strands. These voids act as orifices, allowing air to be drawn into and let out of the motor housing as the motor heats and cools, as described above. In a conventional motor, the degree of air transfer via the stranded cable conductors is relatively minimal due to the presence of other, larger and less restrictive orifices. Because the number of seals has been minimized in the present invention, it is important to ensure that the stranded cable conductors are sealed so as to prevent air transfer via this particular pathway.

In this regard, the present invention incorporates a terminal plate assembly in which each stranded conductor is terminated with a standard compression terminal lug. Each terminal compression lug is bolted to a solid conducting pin, which is covered with an insulator and fixed and sealed to a nonconductive plate. The terminal plate assembly is sealed to the motor housing and completely separates the inside motor housing environment from the exterior environment. The stranded conductors do not penetrate the nonconductive plate; instead, solid conducting pins supply electrical power to the stator through the sealed nonconductive plate. Additional structural details and functional advantages of the present invention are discussed more fully below.

Figure 12:
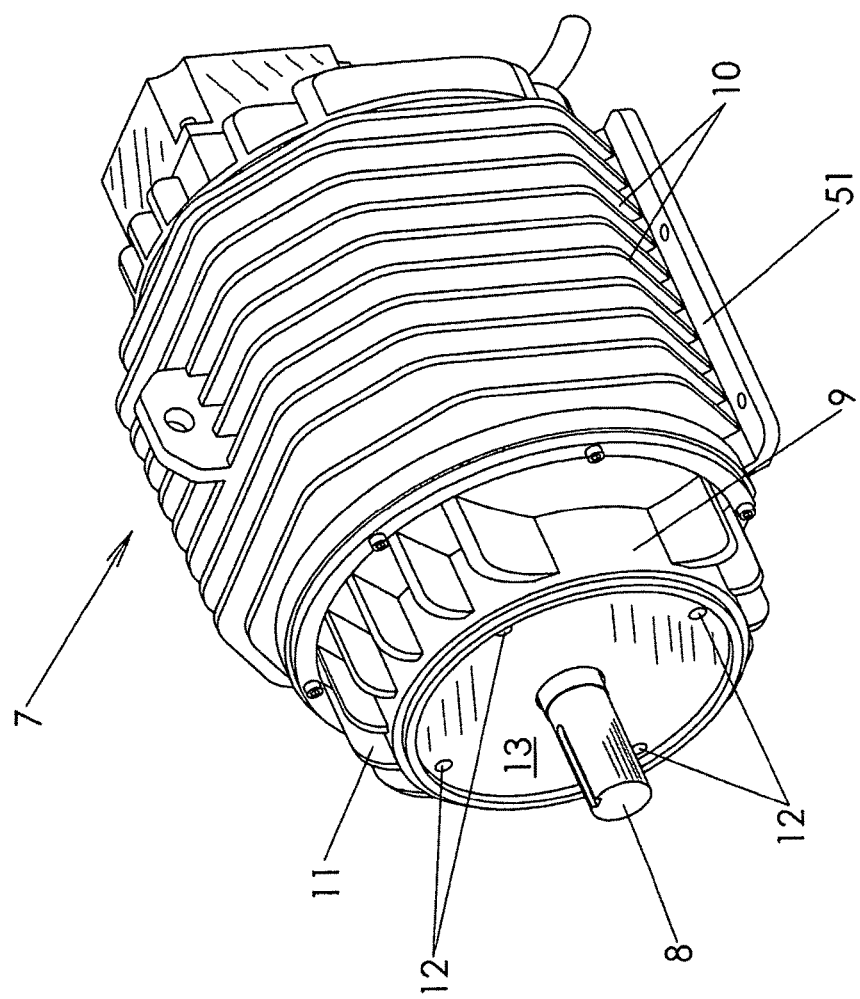
FIG. 12 is a front perspective view of a second embodiment of the present invention.
Figure 13:
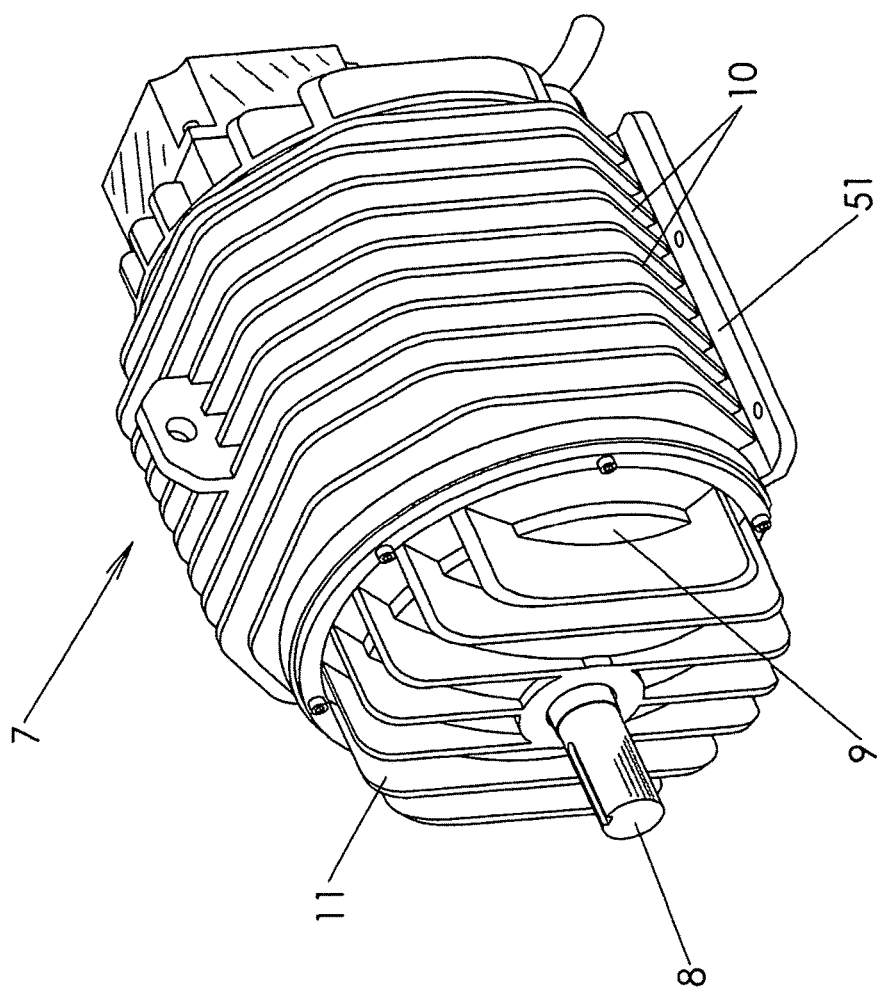
FIG. 13 is a front perspective view of a third embodiment of the present invention.

FIG. 1 is a perspective view of the present invention installed on a roller table. As shown in this figure, the motors 1 are installed on the side of the roller table with a gear box 2 in between the motor 1 and roller table. The drive shaft (not shown) extends from the motor 1 into the gear box 2, under a safety cover 3 that surrounds a coupler (not shown), and into a pillow block bearing 4. The drive shaft is mechanically coupled to the rollers 5 that comprise the roller table 6. Each motor shares the same central lateral axis as the roller 5 to which it is mechanically connected. In FIG. 1, only the first embodiment of the present invention is shown; however, two alternate embodiments are also shown in FIGS. 12 and 13 and discussed below. Although the present invention is shown here in connection with a roller table, application of the present invention is not limited to such use. The present invention may be modified for use in any application in which a submersible-rated motor is needed. Furthermore, the present invention is not limited to the particular table mount configuration shown in FIG. 1; some configurations, for example, will not include the gear box 2.

In a typical application, the motor 1 is in the range of three to 450 horsepower with voltage ranging from 200 to 4000 volts and revolutions per minute (RPM) of 3600 or less; however, the present invention is not limited to these parameters. The motor housing of the present invention is a totally enclosed non-vented (TENV) enclosure. Despite the fact that the term "TENV" is used to describe a number of conventional roller table motors, these motors are not truly totally enclosed and non-vented, for the reasons described above.

Figure 2:
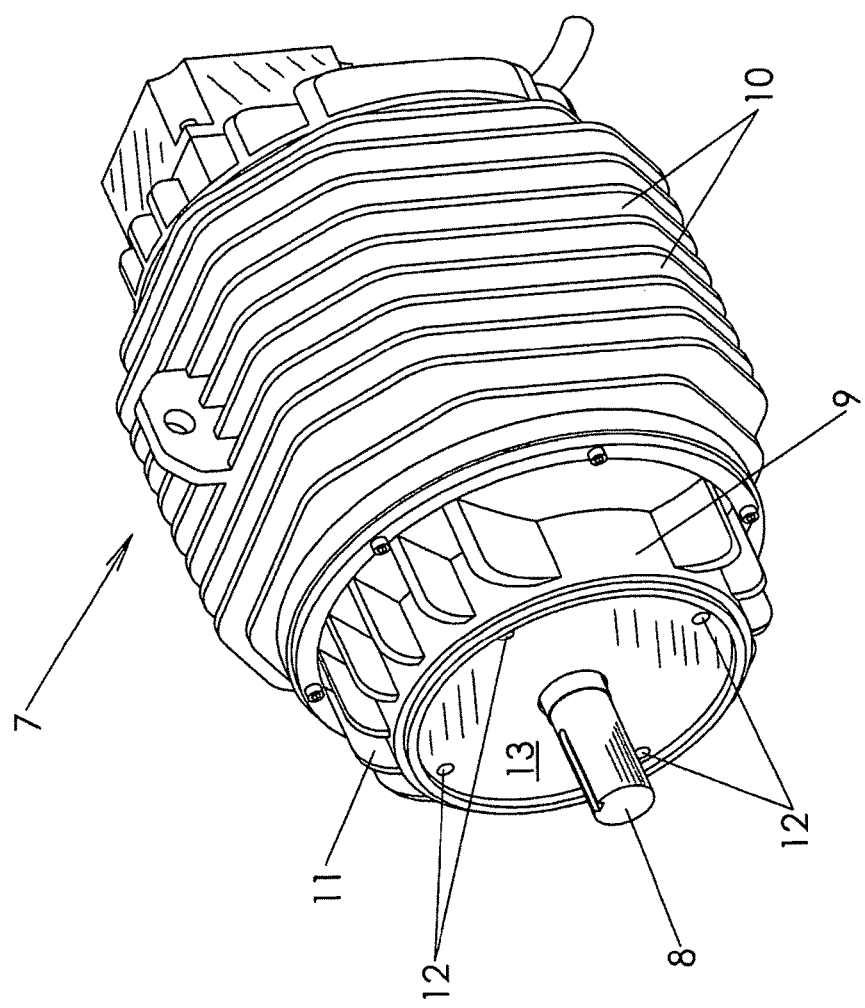
FIG. 2 is a front perspective view of a first embodiment of the present invention.

FIG. 2 is a front perspective view of a first embodiment of the present invention. As shown in this figure, the present invention 1 comprises: a motor housing 7 that encloses the rotor and stator (not shown); a shaft 8 that is driven by the rotor; and a seal housing 9 that encloses a rotating seal assembly (not shown). The motor housing 7 preferably comprises a plurality of radial or "cooling" fins 10 that act to dissipate heat generated by the motor. As shown, the seal housing 9 preferably comprises a plurality of cooling fins 11 as well. As noted above, the shaft 8 extends into the gear box 2 (see FIG. 1), and the bolt holes 12 on the seal housing 9 shown in FIG. 2 attach the face plate 13 of the seal housing 9 to the flange 14 shown in FIG. 1 (this flange is situated between the seal housing 9 and the gear box 2).

Figure 3:
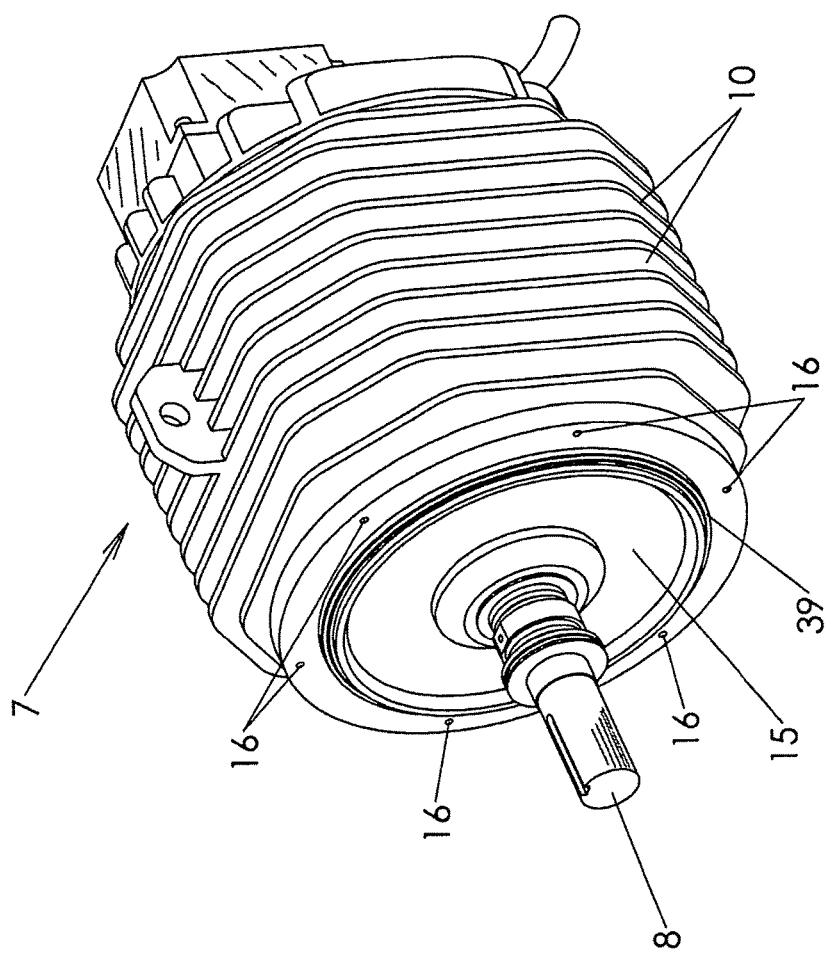
FIG. 3 is a front perspective view of the first embodiment of the present invention shown with the seal housing removed.

FIG. 3 is the same view as FIG. 2, except that the seal housing 9 has been removed. As shown here, a bearing housing 15 lies just inside of the seal housing 9. The purpose of the bearing housing 15 is discussed more fully below. The seal housing 9 contains an oil bath for purposes of lubricating and cooling the seal faces discussed below in connection with FIG. 9. The seal housing 9 is sealed to and piloted for concentricity with the drive end of the motor housing 7 and secured to the motor housing 7 with bolts (not shown) via bolt holes 16. The oil-filled seal housing 9 is integrated into the drive end of the motor housing 7 along with a rotating seal assembly (see FIG. 9). Note that the seal housing 9 is sealed separately from the motor housing 7, which is a key design feature of the present invention (see also FIG. 8).

Figure 4:
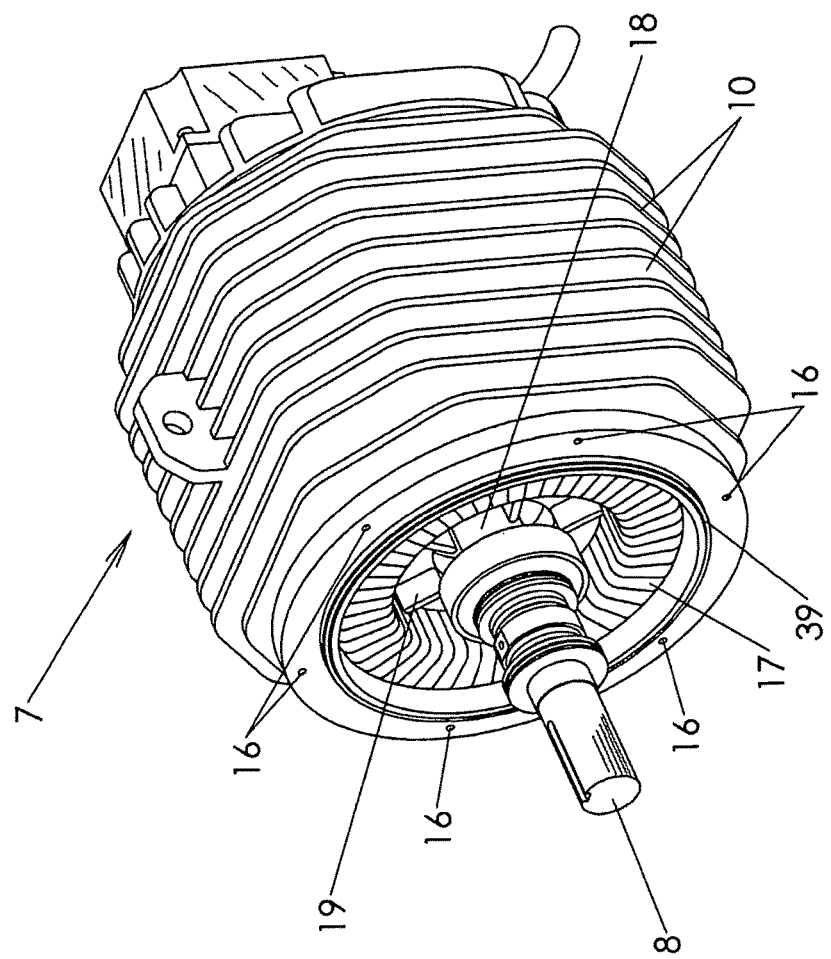
FIG. 4 is a front perspective view of the first embodiment of the present invention shown with the seal and bearing housings removed.

FIG. 4 is the same view as FIG. 3, except that the bearing housing 15 has been removed. As shown in this figure, the motor housing 7 encloses the stator 17, which surrounds and is magnetically coupled to the rotor 18. The rotor 18 comprises radial fins 19 on either end of the rotor; these fins serve to create turbulence as the rotor 18 rotates, thereby dissipating heat. In a preferred embodiment, the bearing housing 15 is integrated into the drive end of the motor housing 7 such that the bearing housing 15 and motor housing 7 constitute a single part. The bearing housing 15 is mounted completely inside of the seal housing 9 and is piloted for concentricity with the motor housing 7.

Figure 5:
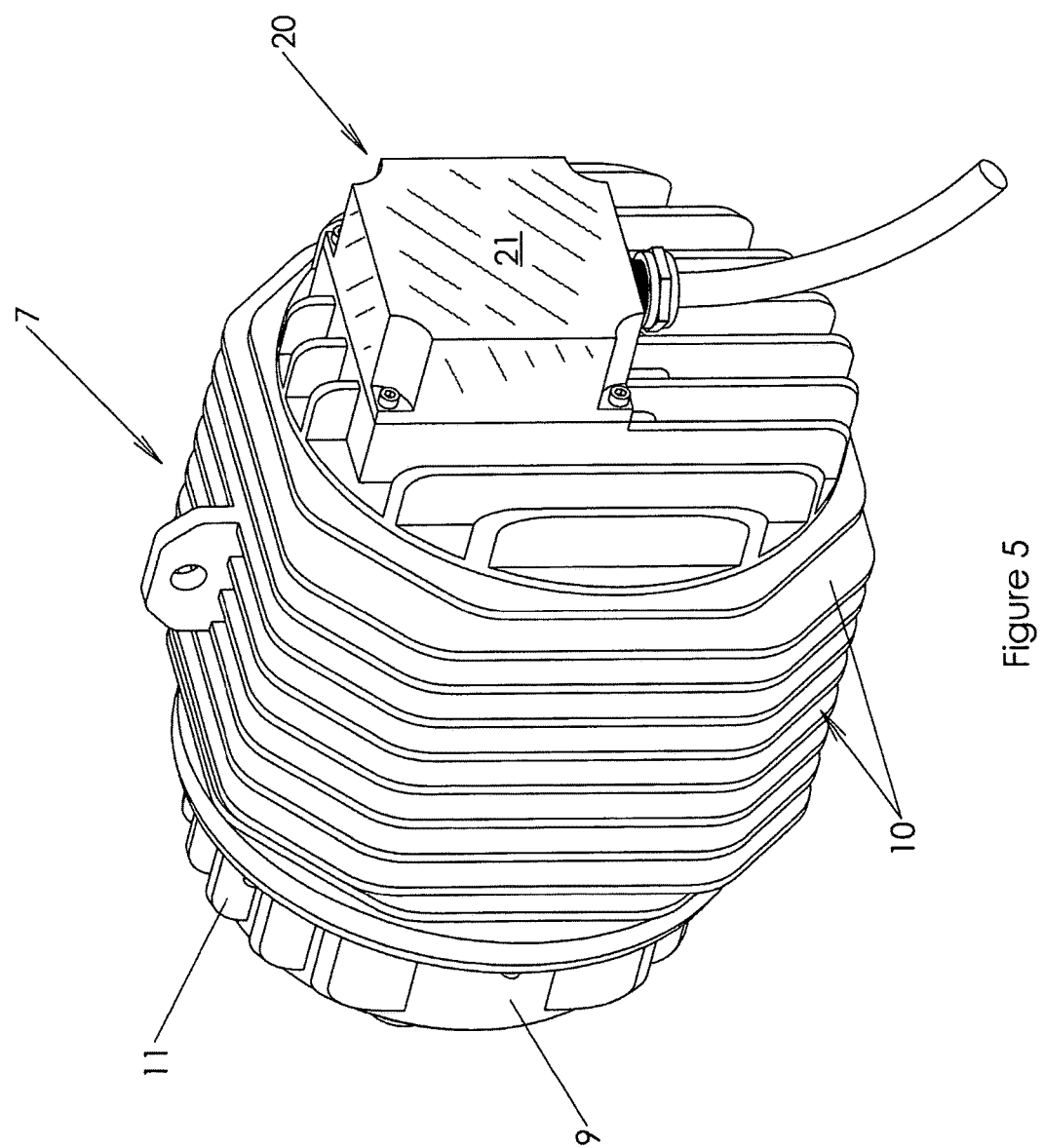
FIG. 5 is a rear perspective view of the first embodiment of the present invention.

FIG. 5 is a rear perspective view of the first embodiment of the present invention. As shown in this figure, the present invention comprises a terminal plate assembly 20 situated on the non-drive (or furthest from the roller table) end of the motor. The terminal plate assembly 20 comprises a terminal plate cover 21 that is removed in FIG. 6. As explained more fully below in connection with FIG. 11, the terminal plate assembly 20 completely seals the incoming electrical supply.

Figure 6:
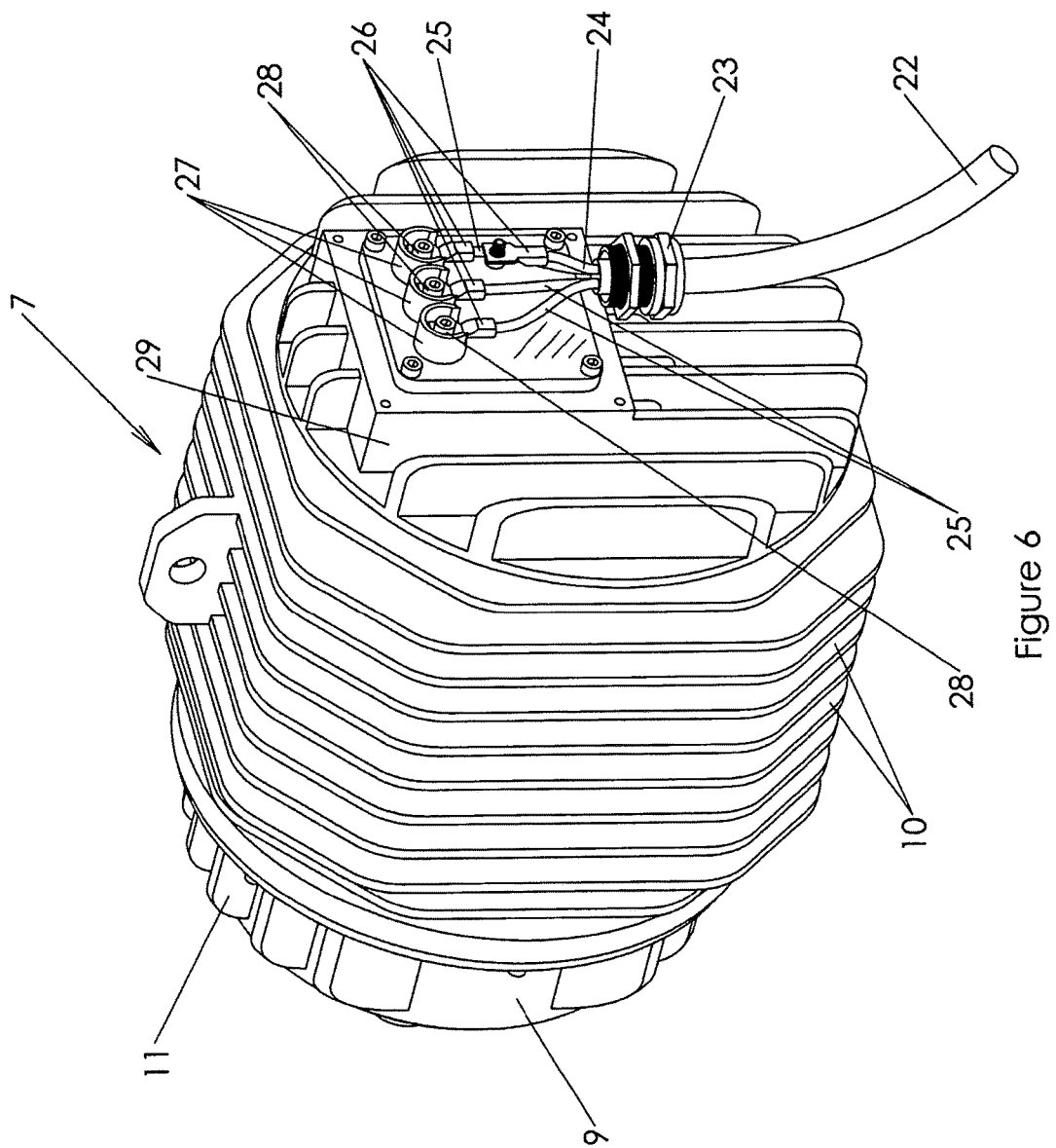
FIG. 6 is a rear perspective view of the first embodiment of the present invention shown with the terminal plate cover removed.

FIG. 6 is the same view as shown in FIG. 5, except that the terminal plate cover 21 has been removed. As shown in this figure, the main conductor cable 22 (which carries power to the motor from an external power source) terminates in a cord grip compression grommet 23. Extending upward from the cord grip compression grommet 23 are a cable ground conductor 24 and cable power conductors 25. Each cable conductor 25 terminates in a terminal lug 26, which is secured to a terminal pin insulator 27 with a retainer bolt 28. Note that the terminal box 29 is integrated into the motor housing 7, which means that the only seal required on this end of the motor is the terminal pin O-ring (see FIG. 7). Further details of the terminal plate assembly 20 are discussed in connection with FIG. 7 below.

Figure 7:
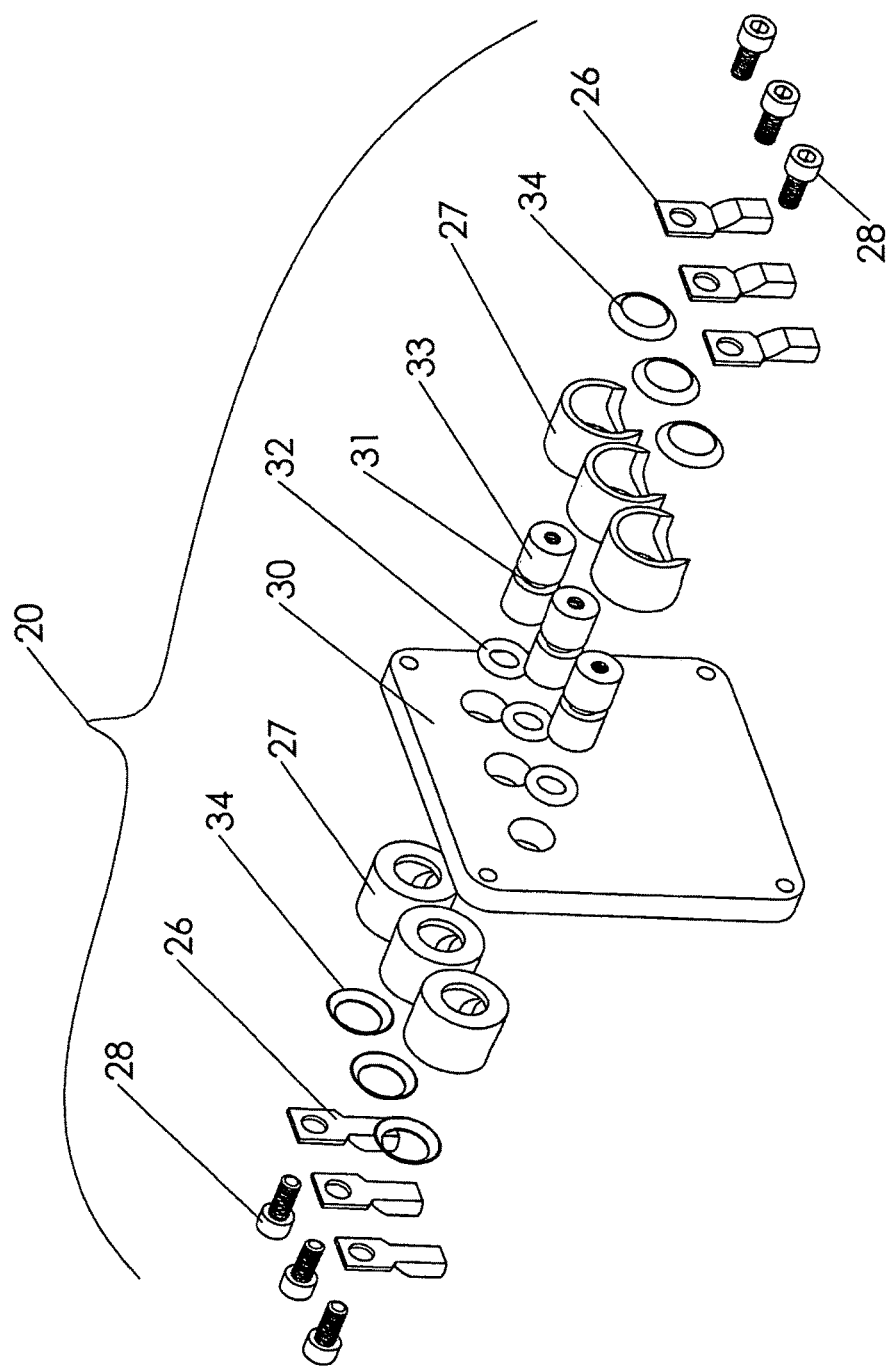
FIG. 7 is an exploded view of the terminal plate assembly shown without the terminal plate cover and terminal box.

Although three horizontally aligned electrical conduits are shown in FIG. 6, the present invention may incorporate additional conduits, which would be constructed similarly to the main electrical conduits shown in FIGS. 6 and 7. These additional conduits may be positioned, for example, underneath the three electrical conduits shown in FIG. 6. The additional conduits could be used to install sensors (for example, pressure, temperature and liquid sensors) inside of the motor housing and may be the same size as or smaller than the main electrical conduits.

FIG. 7 is an exploded view of the terminal plate assembly 20 shown without the terminal plate cover 21 or terminal box 29. The terminal plate 30 is preferably comprised of a nonconductive material such as phenol-aldehyde resin. The plate 30 comprises a hole for each of the three electrical conduits. The terminal pins 33 are electrically conductive and machined with a central groove 31 for receiving the O-rings 32. When installed, the terminal pins 33 are situated within the holes in the terminal plate such that the O-ring 32 creates a seal between the terminal pin 33 and terminal plate 30.

Each terminal pin 33 comprises interiorly threaded ends and a solid center section. The threaded ends of the pins 33 are configured to receive the retainer bolt 28, which secure the terminal lugs 26 and terminal pin insulators 27 to the terminal pins 33. A terminal pin push nut 34 lies between the terminal lug 26 and the outward face of the terminal pin insulator 27. As shown in FIG. 7, assembly of the electrical conduits on the inside of the terminal plate 30 is similar to what has been described on the outside of the terminal plate. Once the terminal plate has been assembled, stator conductors (not shown) and cable conductors 25 are bolted to the threaded ends of the terminal pins 33 via the terminal lugs 26, and the terminal plate 30 is then bolted to the motor housing 7 inside the terminal box 29 and sealed with an O-ring 35 (see FIG. 8). The terminal cover 21 is preferably sealed to the motor housing 7 with an O-ring 36 as well (see FIG. 8).

Figure 8:
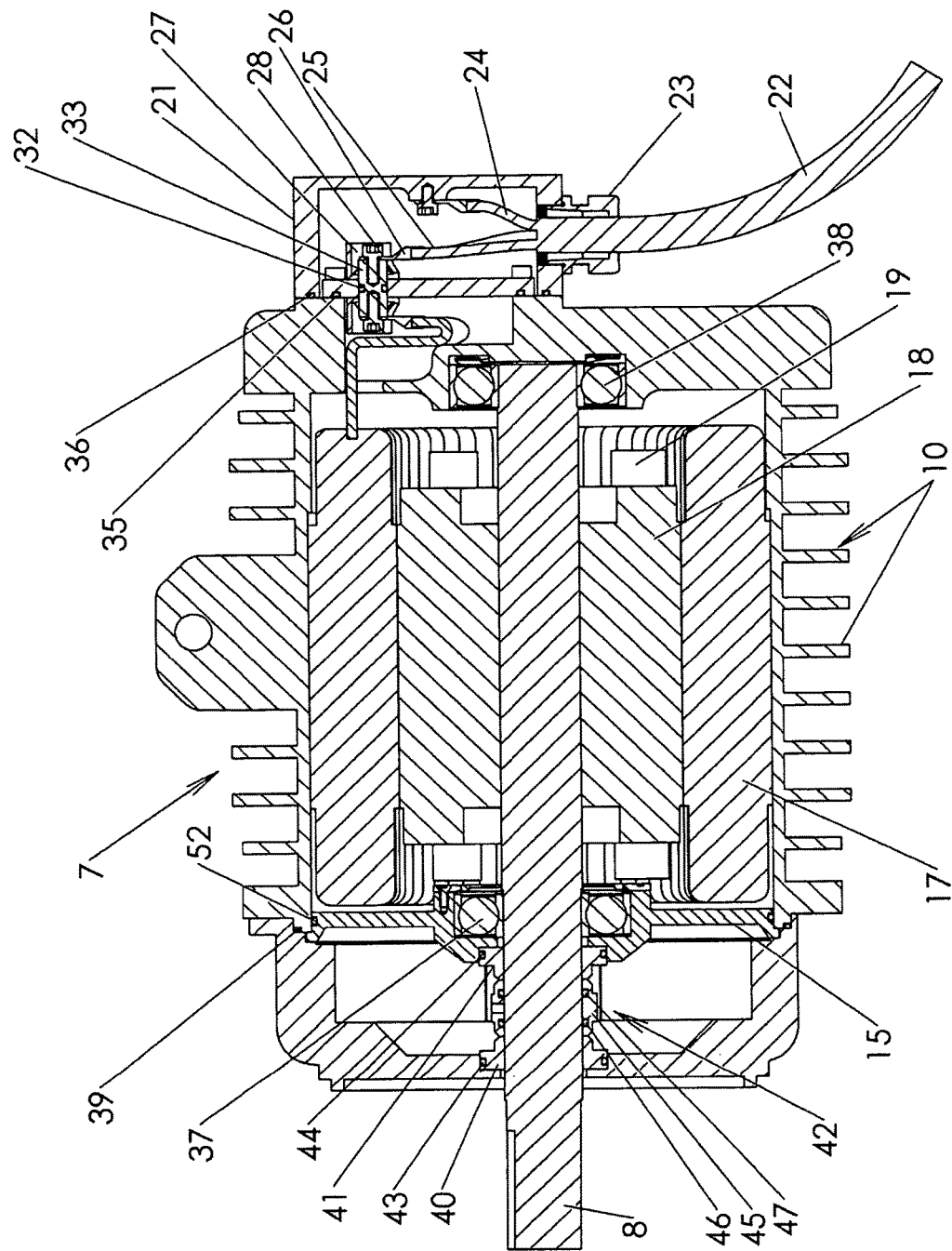
FIG. 8 is a section view of the first embodiment of the present invention.

FIG. 8 is a section view of the first embodiment of the present invention. As shown in this figure, the invention comprises a first ball bearing 37 situated around the shaft 8 on the drive end of the motor and a second ball bearing 38 situated around the terminal end of the shaft 8 on the non-drive end of the motor. As is visually apparent from this figure, the existence of the seal housing 9 means that a greater length of the drive shaft 8 is unsupported by the rotor 18. In order to compensate for this additional unsupported length of the shaft 8, the diameter of the shaft 8 is preferably increased (the magnitude of the increase is dependent upon horsepower, RPM and bearing size). As shown in this figure, the present invention comprises four and only four dependent exterior seals: the cord grip compression grommet 23, the terminal cover O-ring 36, the seal housing O-ring 39 (see also FIG. 3), and the shaft seal assembly shown in FIG. 9. The bearing housing 15 is sealed to the motor housing 7 with a O-ring 52.

Figure 9:
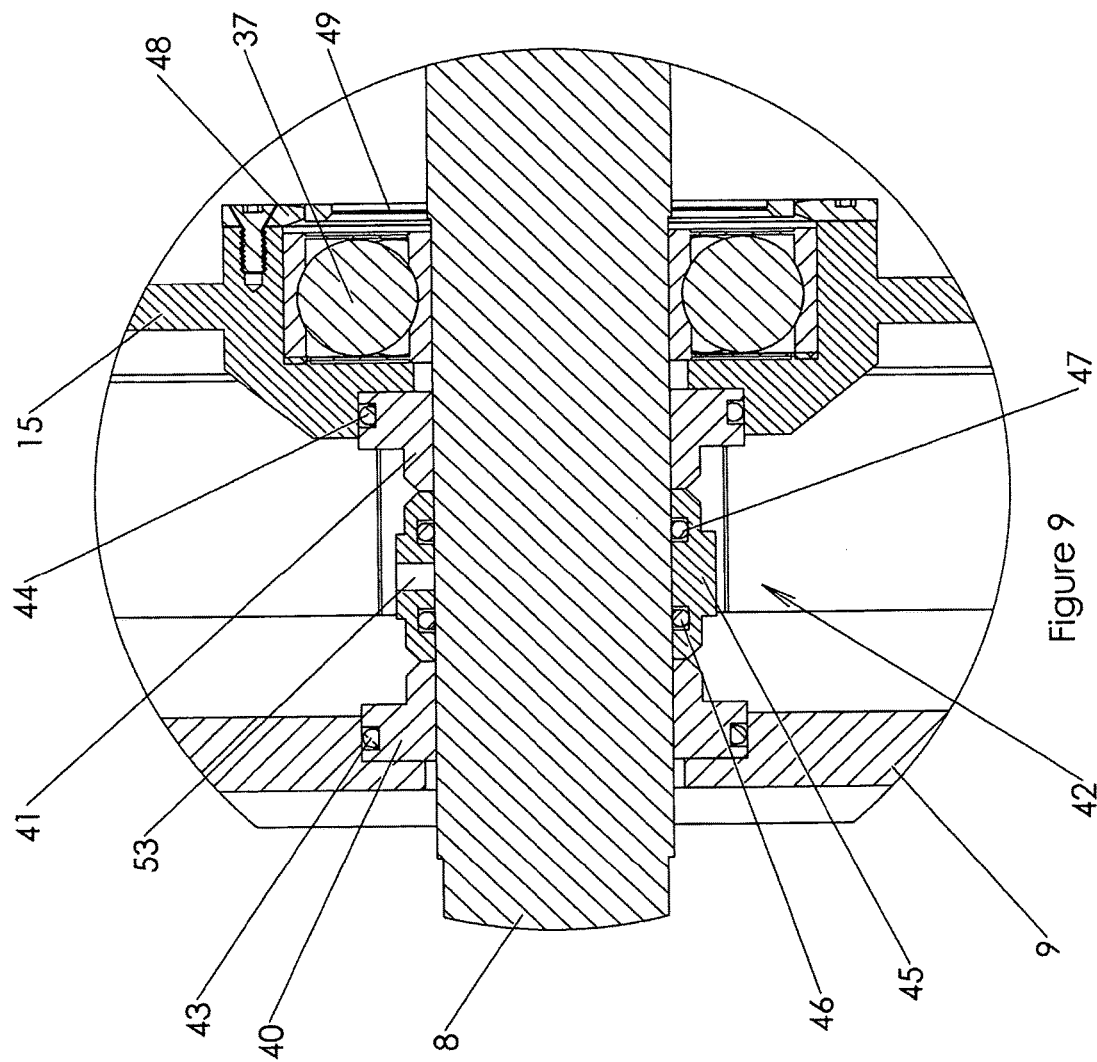
FIG. 9 is a detail view of the shaft seal assembly of the present invention.

FIG. 9 is a detail view of the shaft seal assembly of the present invention. This figure also shows the drive end bearing 37 detail. The shaft seal assembly is situated entirely within the seal housing 9 and comprises a pair of opposing stationary seals 40, 41 and a rotating seal assembly 42 between the two stationary seals. The stationary seals 40, 41 are stationary relative to the shaft 8 and are sealed to the seal housing 9 and bearing housing 15, respectively, with O-rings 43, 44. The rotating seal assembly 42 comprises a rotating seal 45 and two O-rings 46, 47 that seal the rotating seal 45 to the shaft 8. The seals 40, 41 and 45 are preferably comprised of a material such as carbon or ceramic that acts as a secondary lubricant. The oil contained within the seal housing acts as the primary lubricant for the seals 40, 41, and 45.

As shown in FIG. 9, the outer edges (left and right edges from the perspective of FIG. 8) of the rotating seal 45 abut up against the inner edges of the stationary seals 40, 41 with a spring force that is driven axially along the shaft 8. This spring force may be imparted by one or more axially oriented springs that are integral to (part of) the rotating seal 45. One example of such a seal is Model No. WMSED manufactured by Ningbo Yinzhou Wendong Mechanical Seal Factory of Shigi Town, Ningbo, Zhejiang, China. In the embodiment shown in FIG. 9, the rotating seal 45 is affixed to the shaft with set screws 53; however, in other embodiments, the rotating seal 45 may be affixed to the shaft 8 via a rubber O-ring, gasket or liner (without the need for a set screw). Referring back to FIG. 9, O-rings 46, 47 seal the rotating seal 45 to the shaft 8.

In a preferred embodiment, the first ball bearing 37 is held in place by a bearing lock ring 48. The bearing lock ring 48 eliminates any shaft movement from exterior forces. It also forces the shaft to extend toward the second (non-drive end) ball bearing 38 as the shaft expands due to thermal forces; at the non-drive end, this thermal expansion is absorbed by the wave disk spring (discussed below in connection with FIG. 10). FIG. 9 also shows the shaft grounding ring 49, which is situated adjacent to the first ball bearing 37 in this figure but which can also be situated adjacent to the second ball bearing 38. The purpose of the shaft grounding ring 49 is to provide a safe path to ground for any voltage that may be developed by the rotor during operation with a frequency inverter; the shaft grounding ring 49 is made up of small conductive fibers that rub on the shaft and allow this voltage to be safely transferred to the motor housing, where it is directed to ground by the cable ground conductor 24.

Figure 10:
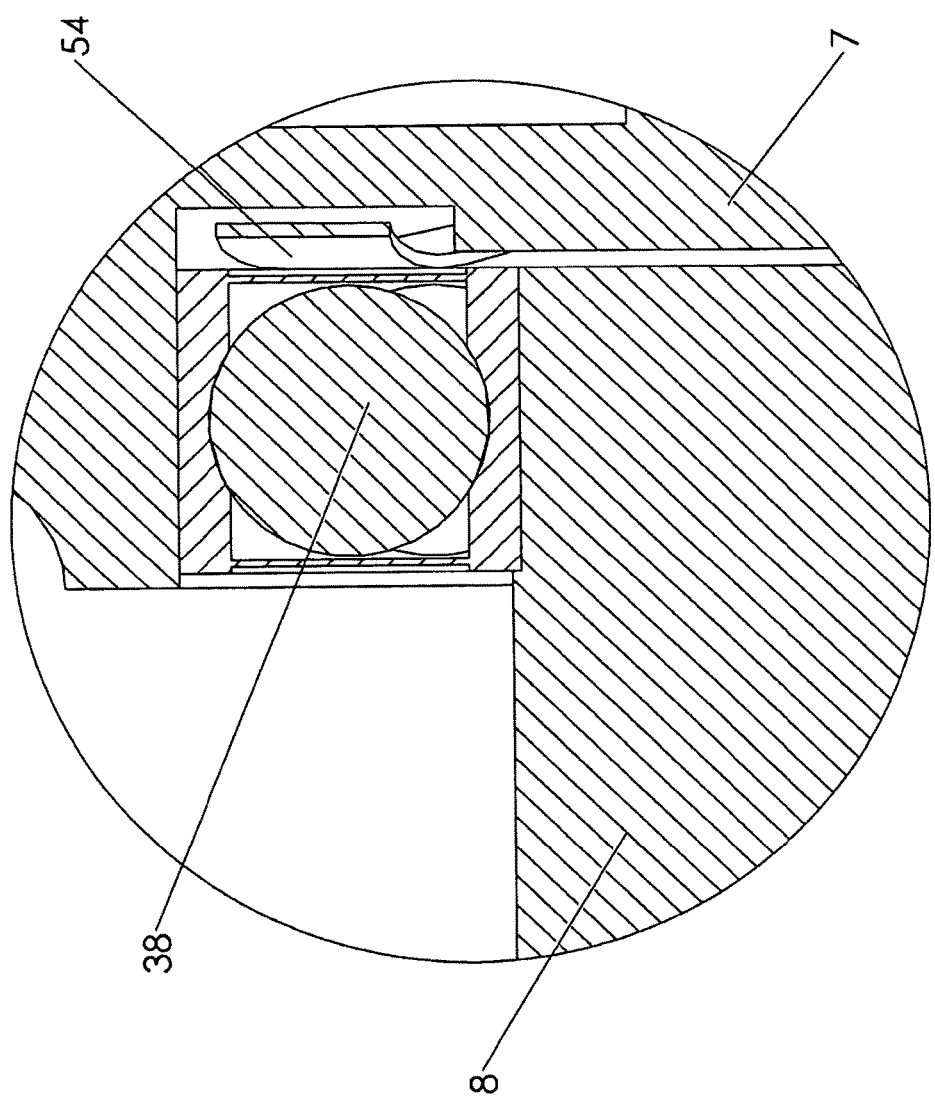
FIG. 10 is a detail view of the non-drive end ball bearing of the present invention.

FIG. 10 is a detail view of the non-drive end ball bearing of the present invention. In a preferred embodiment, the drive end bearing 37 is fixed into position by a bearing lock ring 48, which forces the shaft to extend toward the opposite drive end bearing when the shaft expands thermally. The force is thus absorbed by a wave disk spring 54 situated adjacent to the non-drive end bearing 38 on the outer (distal) end of the bearing 38. Note that the wave disk spring 54 is configured so that it does not come into contact with the shaft 8 but only with the bearing 38.

Figure 11:
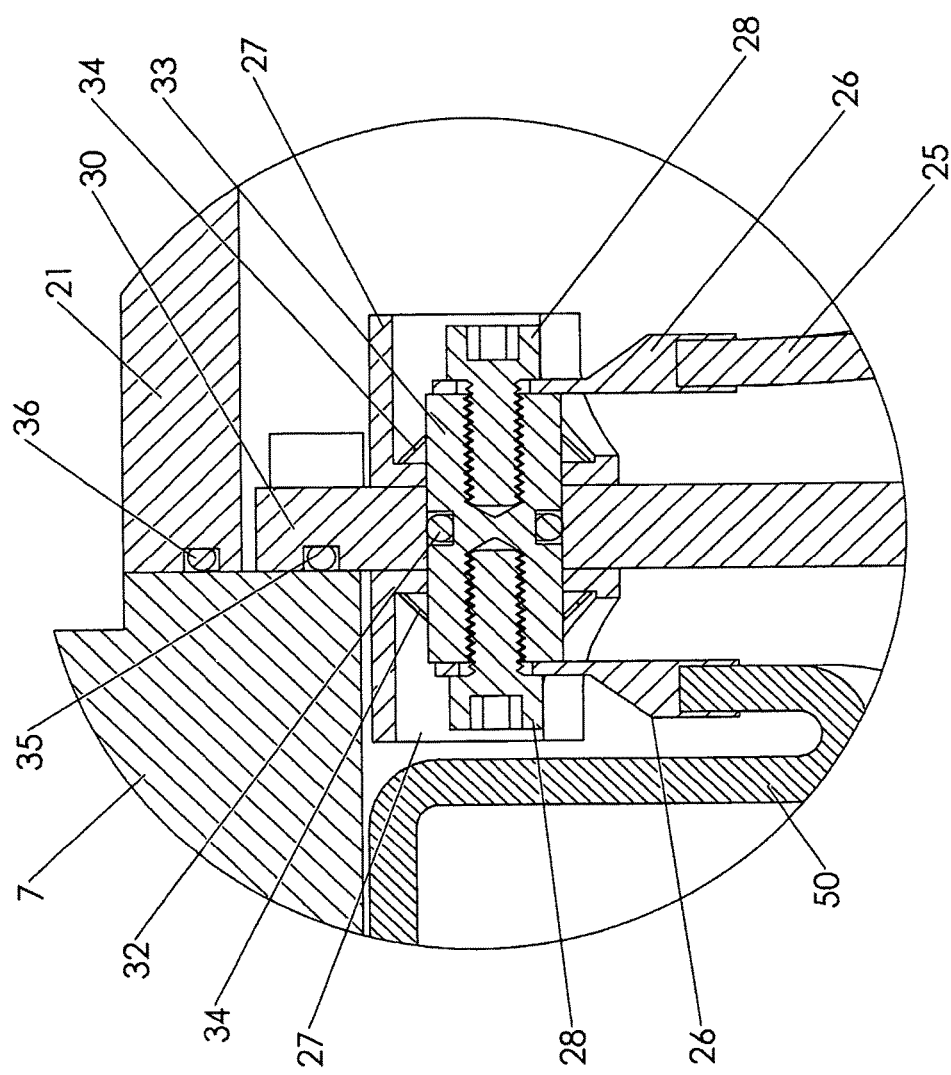
FIG. 11 is a detail view of the terminal plate assembly of the present invention.

FIG. 11 is a detail view of the terminal plate assembly of the present invention. All parts have been previously described, except that the stator conductors 50 mentioned in the discussion of FIG. 7 are labeled here.

FIG. 12 is a front perspective view of a second embodiment of the present invention. This embodiment differs from the first embodiment only in that it includes a foot 51 for mounting purposes.

Figure 14:
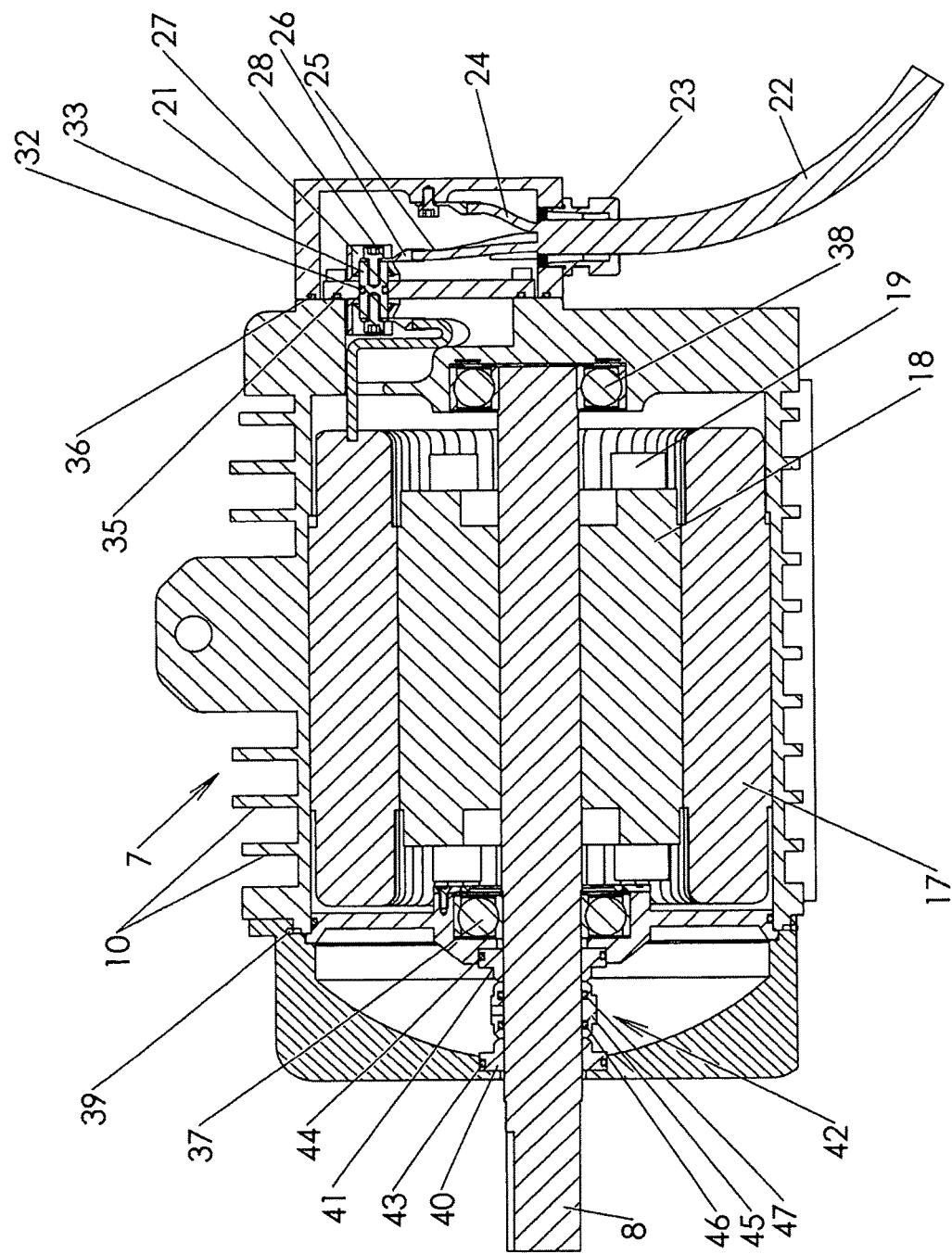
FIG. 14 is a section view of the third embodiment of the present invention.

FIG. 13 is a front perspective view and FIG. 14 is a section view of a third embodiment of the present invention. The only difference between this embodiment and the second embodiment is the size and shape of the seal housing 9/oil reservoir (compare FIG. 13 to FIG. 12). The embodiment shown in FIG. 13 would be used when the mount to the roller table does not require a C-face and when the motor is only mounted to a base. The C-face embodiments shown in FIGS. 1-12 would be used when there is a C-face adapter on either the gear box 2 or roller table.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A submersible-rated motor comprising:
   (a) a motor housing that is configured to enclose a stator and a rotor and to partially enclose a drive shaft, the motor housing comprising a drive end and a non-drive end, wherein the motor housing comprises a non-drive end bearing housing that is cast together with the motor housing as a single part so that there is no seal between the motor housing and the non-drive end bearing housing;
   (b) a terminal plate assembly comprising a terminal box and a removable terminal cover, wherein the terminal box is cast together with the non-drive end of the motor housing as a single part so that there is no seal between the terminal box and the non-drive end of the motor housing, wherein the terminal plate assembly is configured to receive one or more stranded power conductors on a first side of a nonconductive terminal plate, wherein each of the power conductors is attached to the terminal plate assembly with a standard compression terminal lug, wherein each terminal lug is bolted to a terminal pin that is both solid and conductive, wherein each terminal pin is fixed and sealed to the terminal plate, wherein each terminal pin comprises a central groove that is configured to receive an O-ring, and wherein the terminal plate assembly is sealed to the motor housing;
   (c) a seal housing that is sealed separately from the motor housing and configured to contain a shaft seal assembly and an oil reservoir, wherein the seal housing is piloted for concentricity with the drive end of the motor housing and sealed directly to the drive end of the motor housing with an O-ring; and
   (d) a drive end bearing housing that is mounted completely inside of the seal housing and piloted for concentricity with the motor housing, wherein the drive end bearing housing is configured to enclose a first ball bearing situated around the drive shaft on the drive end of the motor;
   wherein the non-drive end bearing housing is configured to enclose a second ball bearing that is situated around the drive shaft on the non-drive end of the motor.

2. The motor of claim 1, wherein each of the terminal lugs is secured to a terminal pin insulator that covers the terminal pin.

3. The motor of claim 2, wherein the terminal plate assembly is configured to receive one or more stranded stator conductors on a second side of the terminal plate, wherein each of the stator conductors is attached to the terminal plate assembly with a standard compression terminal lug, wherein each terminal lug is bolted to a terminal pin that is both solid and conductive, and wherein each terminal pin is fixed and sealed to the terminal plate.

4. The motor of claim 3, wherein each terminal pin comprises interiorly threaded ends and a solid center section, wherein the threaded ends of the terminal pin are configured to receive a retainer bolt that secures a terminal lug to the terminal pin.

5. The motor of claim 1, wherein the shaft seal assembly is situated entirely within the seal housing and comprises a first stationary seal, a second stationary seal, and a rotating seal assembly;
   wherein the rotating seal assembly is situated between the first and second stationary seals;
   wherein the first stationary seal is sealed to the seal housing, and second stationary seal is sealed to the drive end bearing housing; and wherein the rotating seal assembly comprises a rotating seal and at least one O-ring that is configured to seal the rotating seal to the drive shaft.

6. The motor of claim 5, wherein the rotating seal comprises a first outer edge and a second outer edge, the first stationary seal comprises an inner edge, and the second stationary seal comprises and inner edge; and wherein the first outer edge of the rotating seal abuts up against the inner edge of the first stationary seal with a spring force that is driven axially along the drive shaft, and the second outer edge of the rotating seal abuts up against the inner edge of the second stationary seal with a spring force that is driven axially along the drive shaft.

7. The motor of claim 1, wherein the first ball bearing is secured to the drive end bearing housing with a bearing lock ring.

8. The motor of claim 1, further comprising a shaft grounding ring that is configured to conduct electrical voltage from the drive shaft to the motor housing.

9. The motor of claim 8, further comprising a wave disk spring that is situated adjacent to the non-drive end bearing on an outer end of the non-drive end bearing, wherein the wave disk spring is configured to contact the non-drive end bearing but not the drive shaft.

10. The motor of claim 1, wherein the motor comprises only four dependent exterior seals, the four dependent exterior seals consisting of a cord grip compression grommet, a terminal cover O-ring, a seal housing O-ring, and the shaft seal assembly.

* * * * *